US012335146B2

(12) United States Patent
Sivakumar et al.

(10) Patent No.: US 12,335,146 B2
(45) Date of Patent: Jun. 17, 2025

(54) DYNAMIC, CONDITION-BASED NETWORK DEVICE CONTINUITY OPTIMIZATION

(71) Applicant: INTERNATIONAL BUSINESS MACHINES CORPORATION, Armonk, NY (US)

(72) Inventors: Gandhi Sivakumar, Bentleigh (AU); Tanmay Jayant Mujumdar, Pune (IN); Kushal S. Patel, Pune (IN); Sarvesh S. Patel, Pune (IN)

(73) Assignee: INTERNATIONAL BUSINESS MACHINES CORPORATION, Amork, NY (US)

( * ) Notice: Subject to any disclaimer, the term of this patent is extended or adjusted under 35 U.S.C. 154(b) by 0 days.

(21) Appl. No.: 18/334,423

(22) Filed: Jun. 14, 2023

(65) Prior Publication Data

US 2024/0422101 A1 Dec. 19, 2024

(51) Int. Cl.
*H04L 47/122* (2022.01)
*H04L 43/0817* (2022.01)
*H04L 47/2425* (2022.01)

(52) U.S. Cl.
CPC ........ *H04L 47/122* (2013.01); *H04L 43/0817* (2013.01); *H04L 47/2433* (2013.01)

(58) Field of Classification Search
CPC ......................... H04L 47/122; H04L 43/0817; H04L 47/2433

(Continued)

(56) References Cited

U.S. PATENT DOCUMENTS 6,633,835 B1 * 10/2003 Moran ................ H04L 47/2441 702/182
7,936,770 B1 * 5/2011 Frattura ............. H04L 47/6215 370/357

(Continued)

FOREIGN PATENT DOCUMENTS

CN 108353034 B 2/2022
CN 114095287 A 2/2022

OTHER PUBLICATIONS

ACKP, "Preventing Overheating in Datacenter", available Online at: https://www.akcp.com/articles/preventing-overheating-in-data-center/ (May 2021) (11 pages).

(Continued)

*Primary Examiner* — Ario Etienne
*Assistant Examiner* — Kidest Mendaye
(74) *Attorney, Agent, or Firm* — Tihon Poltavets, Esq; Kevin P. Radigan, Esq.; Heslin Rothenberg Farley & Mesiti P.C.

(57) ABSTRACT

Condition-based, selective workload reduction through at least one port of a network device is provided. The process includes determining, by a network device of a computing environment, that the network device has a defined condition, and obtaining, by the network device, classifications of applications using the network device, where the classifications include multiple different application classifications. Further, the process includes reducing, by the network device, workload through at least one port of the network device based on determining that the network device has the defined condition. The reducing includes reducing workload through the at least one port of the network device of an application of a particular application classification of the multiple different application classifications, without reducing workload through a selected port of the network device (Continued)

NETWORK DEVICE CONTINUITY OPTIMIZATION PROCESS — 300

OBTAIN OPERATIONAL DATA ON NETWORK DEVICE, INCLUDING ONE OR MORE NETWORK DEVICE COMPONENTS — 302

DETERMINE THE NETWORK DEVICE HAS A DEFINED CONDITION — 304

IDENTIFY OTHER DEVICES/SYSTEMS CONNECTED TO THE PORTS OF THE NETWORK DEVICE — 306

OBTAIN APPLICATION CLASSIFICATIONS RELATED TO WORKLOAD PASSING THROUGH THE NETWORK DEVICE — 308

DETERMINE PORT PRIORITIES BASED ON THE DEFINED CONDITION — 310

REDUCE WORKLOAD ON ONE OR MORE NETWORK DEVICE PORTS BASED ON THE PORT PRIORITIES AND THE APPLICATION CLASSIFICATIONS (AND, BASED ON LOCATION OF THE ONE OR MORE NETWORK DEVICE PORTS, FOR INSTANCE, WITH REFERENCE TO LOCATION OF THE DEFINED CONDITION) — 312 of another application of a different application classification of the multiple different application classifications.

20 Claims, 11 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 10,019,181 | B2 | 7/2018 | Singh et al. | |
| 10,140,036 | B2 | 11/2018 | Kelner et al. | |
| 10,574,529 | B2 | 2/2020 | Marinelli et al. | |
| 11,368,412 | B2 | 6/2022 | Anubolu et al. | |
| 2013/0080678 | A1 | 3/2013 | Buckland et al. | |
| 2013/0080679 | A1 | 3/2013 | Bert | |
| 2014/0052311 | A1 | 2/2014 | Geissler et al. | |
| 2015/0185813 | A1 | 7/2015 | Ping et al. | |
| 2015/0323940 | A1* | 11/2015 | Venkatesan | G05D 23/1917 700/300 |
| 2015/0331473 | A1 | 11/2015 | Jreji et al. | |
| 2016/0062421 | A1 | 3/2016 | Sugawara et al. | |
| 2016/0373368 | A1* | 12/2016 | Shamis | H04L 47/58 |
| 2018/0120913 | A1* | 5/2018 | Vincent | G06F 1/3203 |
| 2018/0321864 | A1 | 11/2018 | Benisty | |
| 2019/0053405 | A1* | 2/2019 | Wang | G06F 1/206 |
| 2019/0082010 | A1 | 3/2019 | Friedman et al. | |
| 2019/0089578 | A1* | 3/2019 | Dadey | H04L 49/555 |
| 2019/0149399 | A1* | 5/2019 | Reed | H04L 41/0895 709/223 |
| 2022/0286401 | A1* | 9/2022 | Kadosh | H04L 47/31 |

OTHER PUBLICATIONS

Liu, Zhiyu et al., "A Port-Based Forwarding Load-Balancing Scheduling Approach for Cloud Datacenter Networks", Journal of Cloud Computing: Advances, Systems and Applications, vol. 10, Article 13 (Feb. 2021) (14 pages).

Perry, Jonathan et al., "Fastpass: A Centralized "Zero-Queue" Datacenter Network", ACM SIGCOMM Computer Communication Review '14, https://dl.acm.org/doi/10.1145/2740070.2626309 (Aug. 2014) (12 pages).

VanDamme, Tobias et al., "Optimized Thermal-Aware Job Scheduling and Control of Data Centers", IEEE Transactions on Control Systems Technology, vol. 20, Issue 2 (Jan. 2018) (12 pages).

* cited by examiner

P1, P17, AND P3 REMAIN ON
P16, P2, AND P18 ARE POWERED OFF AND THE PORTS DISSIPATE HEAT FROM THEIR NEIGHBORING PORTS

DYNAMIC, CONDITION-BASED NETWORK DEVICE CONTINUITY OPTIMIZATION

BACKGROUND

One or more aspects relate, in general, to facilitating processing within a computing environment, and more particularly, to dynamic, condition-based network device continuity optimization, where the optimization includes, for instance, selective reduction of input output (IO) workload through one or more ports of a network device based on detection of a defined condition at the network device.

Generally, a storage area network (SAN) is a network of storage devices accessible by multiple servers or computers, which provides a shared storage space. Computer memory and local storage resources might not provide enough storage, storage protection, multiple-user access, and/or speed and performance for various applications. Many entities employ some form of a storage area network, and/or a network attached storage (NAS) for improved efficiency and better data management.

Traditionally, only a limited number of storage devices could attach to a server, limiting a network storage capacity. However, a storage area network (SAN) introduces networking flexibility enabling one server, or many heterogeneous servers (for instance, across multiple data centers), to share a common storage utility. The storage area network eliminates the traditional dedicated connection between a network file server and storage, and the concept that the server effectively owns and manages the storage devices, eliminating bandwidth bottlenecks. A storage area network thus eliminates single points of failure to enhance storage reliability and availability.

Cloud storage allows for the saving of data and files in an offsite location accessible through, for instance, the public Internet and/or a dedicated private network connection. Data transferred for storage becomes the responsibility of the storage provider. The provider hosts, secures, manages, and maintains, the storage service and associated infrastructure to retain the data, and ensures access to the data when needed.

There are many storage solutions in use. Certain storage providers build storage services on private platforms, while other providers use various open-source platforms. By way of example, cloud storage is available in private, public and hybrid cloud configurations.

SUMMARY

Certain shortcomings of the prior art are overcome, and additional advantages are provided herein through the provision of a computer-implemented method for enhancing processing within a computing environment. The computer-implemented method includes determining, by a network device of the computing environment, that the network device has a defined condition, and obtaining, by the network device, classifications of applications using the network device, where the classifications include multiple different application classifications. Further, the computer-implemented method includes reducing, by the network device, workload through at least one port of the network device based on determining that the network device has the defined condition. The reducing includes reducing workload through the at least one port of the network device of an application of a particular application classification of the multiple different application classifications, without reducing workload through a selected port of the network device of another application of a different application classification of the multiple different application classifications. Improved processing within a computing environment is provided by continuing operation of a network device in an optimized operational configuration based on presence of a defined condition at the network device, such as a component failure or an overheating condition. In one embodiment, the optimization process facilitates selective network device workload reduction based on determining that the network device has a defined condition. In this manner, operational capacity of the network device is protected for one or more applications, while selectively reducing available capacity for one or more other applications.

In one or more embodiments, the selected port of the network device is a port of the at least one port of the network device, and the reducing includes reducing application workload through the selected port of the network device of the particular application classification, without reducing application workload through the selected port of the network device of the different application classification. In this manner, presence of the defined condition results in application workload through the selected port being selectively reduced based on classification, while allowing workload of a different application classification to pass without reduction.

In one embodiment, the particular application classification is a lower priority application classification, and the different application classification is a higher priority application classification, where the higher priority application classification is a higher priority application classification than the lower priority application classification. Advantageously, with presence of the defined condition, the network device prioritizes handling workload of an application with a higher priority application classification over workload of an application with a lower priority application classification, thereby optimizing continued operation of the network device.

In one or more embodiments, the selected port of the network device is different from the at least one port of the network device, and the reducing workload through the at least one port of the network device further includes powering OFF the at least one port of the network device without powering OFF the selected port of the network device. In this manner, continued operation of the network device is extended by powering OFF at least one port of the network device without powering OFF another, selected port of the network device, where the powered OFF port is handling workload of an application of the particular application classification.

In one or more embodiments, the computer-implemented method further includes identifying, by the network device, the at least one port based on location of the at least one port within the network device. In one embodiment, the identifying includes identifying, by the network device, the location of the at least one port within the network device further based on the defined condition. Advantageously, reducing workload through the at least one port of the network device based on location of the at least one port within the network device and based on the defined condition allows for, for instance, reducing workload through the at least one port of the network device in a region of the network device effected by the defined condition, thereby optimizing continued operation of the network device, notwithstanding presence of the defined condition.

In one or more embodiments, the reducing includes reducing, by the network device, workload through multiple ports of the network device based on determining that the network device has the defined condition, and wherein the reducing further includes selecting the multiple ports. The selecting includes selecting the multiple ports of the network device from alternate port locations on the network device for potential shutdown. Further, the reducing includes validating for shutdown a port of the multiple ports of the network device by confirming that the port handles only application workload of the particular application classification, and powering OFF the validated port to facilitate reducing workload through the network device. By selecting alternate port locations on the network device for potential shutdown, powering OFF of validated alternate ports facilitates, for instance, dissipation of heat from the network device, particularly in a location of the network device most effected by the defined condition.

In one or more implementations, the determining, by the network device of the computing environment, that the network device has the defined condition includes obtaining operational data on the network device, including one or more components of the network device, and based on the operational data, identifying by the network device, that the network device has the defined condition, where the defined condition includes a failure of a component of the one or more components of the network device. Advantageously, based on the operational data, the network device identifies presence of the defined condition, where the defined condition includes a failure of a component of the one or more components of the network device, and based on identifying presence of the defined condition, the network device optimizes its continued operation by reducing workload through the at least one port of the network device. The reducing includes selective network device workload reduction to protect operational capacity of the network device for one or more applications, while selectively reducing available capacity for one or more other applications.

In one or more embodiments, the defined condition is an overheating of the network device, and the computer-implemented method further includes identifying a port of the network within a region of overheating of the network device, where the at least one port of the network device includes the identified port within the region of overheating of the network device. Advantageously, the identified port within the region of overheating of the network device is included in the at least one port of the network device with reduced workload in order to facilitate continued operation of the network device, notwithstanding presence of the defined condition. Further, by reducing workload through the identified port within the region of overheating of the network device, cooling of the network device is facilitated.

In one embodiment, the defined condition is selected from the group consisting of a component failure within the network device and an overheating of the network device, and the network device is a storage area network switch. Advantageously, improved processing within the computing environment is provided by dynamically optimizing the network device for continued operation, notwithstanding presence of a component failure within the network device or an overheating of the network device, including where the network device is a storage area network switch.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
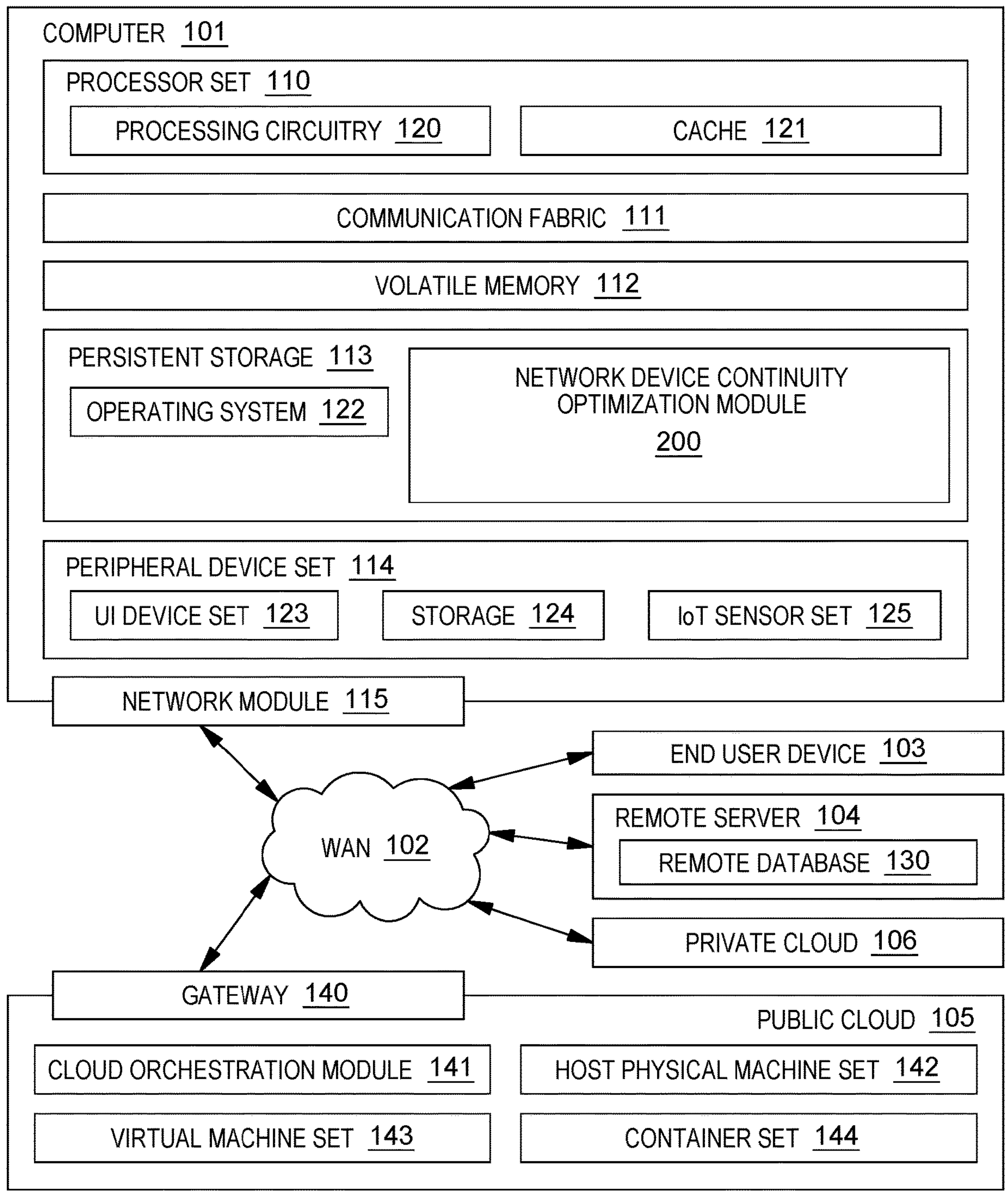
FIG. 1 depicts one example of a computing environment to include and/or use one or more aspects of the present invention.

In one or more aspects, disclosed herein are computer-implemented methods of facilitating processing within a computing environment. The computer-implemented method includes determining, by a network device of the computing environment, that the network device has a defined condition, and obtaining, by the network device, classifications of applications using the network device, where the classifications include multiple different application classifications. Further, the computer-implemented method includes reducing, by the network device, workload through at least one port of the network device based on determining that the network device has the defined condition. The reducing includes reducing workload through the at least one port of the network device of an application of a particular application classification of the multiple different application classifications, without reducing workload through a selected port of the network device of another application of a different application classification of the multiple different application classifications. Improved processing within a computing environment is provided by continuing operation of a network device in an optimized operational configuration, based on presence of a defined condition at the network device, such as a component failure or an overheating condition. In one embodiment, the optimization process facilitates selective network device workload reduction based on determining that the network device has a defined condition. In this manner, operational capacity of the network device is protected for one or more applications, while selectively reducing available capacity for one or more other applications.

In one or more embodiments, the selected port of the network device is a port of the at least one port of the network device, and the reducing includes reducing application workload through the selected port of the network device of the particular application classification, without reducing application workload through the selected port of the application device of the different application classification. In this manner, presence of the defined condition results in application workload through the selected port being selectively reduced based on classification, while allowing workload of a different application classification to pass without reduction.

In one embodiment, the particular application classification is a lower priority application classification, and the different application classification is a higher priority application classification, where the higher priority application classification is a higher priority application classification than the lower priority application classification. Advantageously, with presence of the defined condition, the network device prioritizes handling workload of an application with a higher priority application classification over workload of an application with a lower priority application classification, thereby optimizing continued operation of the network device.

In one or more embodiments, the selected port of the network device is different from the at least one port of the network device, and the reducing workload through the at least one port of the network device further includes powering OFF the at least one port of the network device without powering OFF the selected port of the network device. In this manner, continued operation of the network device is extended by powering OFF at least one port of the network device without powering OFF another, selected port of the network device, where the powered OFF port is handling workload of an application of the particular application classification.

In one or more embodiments, the computer-implemented method further includes identifying, by the network device, the at least one port based on location of the at least one port within the network device. In one embodiment, the identifying includes identifying, by the network device, the location of the at least one port within the network device further based on the defined condition. Advantageously, reducing workload through the at least one port of the network device based on location of the at least one port within the network device and based on the defined condition allows for, for instance, reducing workload through the at least one port of the network device in a region of the network device effected by the defined condition, thereby optimizing continued operation of the network device, notwithstanding presence of the defined condition.

In one or more embodiments, the reducing includes reducing, by the network device, workload through multiple ports of the network device based on determining that the network device has the defined condition, where the reducing further includes selecting the multiple ports. The selecting includes selecting the multiple ports of the network device from alternate port locations on the network device for potential shutdown. Further, the reducing includes validating for shutdown a port of the multiple ports of the network device by confirming that the port handles only application workload of the particular application classification, and powering OFF the validated port to facilitate reducing workload through the network device. By selecting alternate port locations on the network device for potential shutdown, powering OFF of validated alternate ports facilitates, for instance, dissipation of heat from the network device, particularly in a location of the network device most effected by the defined condition.

In one or more implementations, the determining, by the network device of the computing environment, that the network device has the defined condition includes obtaining operational data on the network device, including one or more components of the network device, and based on the operational data, identifying by the network device, that the network device has the defined condition, where the defined condition includes a failure of a component of the one or more components of the network device. Advantageously, based on the operational data, the network device identifies presence of the defined condition, where the defined condition includes a failure of a component of the one or more components of the network device, and based on identifying presence of the defined condition, the network device optimizes its continued operation by reducing workload through the at least one port of the network device. The reducing includes selective network device workload reduction to protect operational capacity of the network device for one or more applications, while selectively reducing available capacity for one or more other applications.

In one or more embodiments, the defined condition is an overheating of the network device, and the computer-implemented method further includes identifying a port of the network within a region of overheating of the network device, where the at least one port of the network device includes the identified port within the region of overheating of the network device. Advantageously, the identified port within the region of overheating of the network device is included in the at least one port of the network device with reduced workload in order to facilitate continued operation of the network device, notwithstanding presence of the defined condition. Further, by reducing workload through the identified port within the region of overheating of the network device, cooling of the network device is facilitated.

In one embodiment, the defined condition is selected from the group consisting of a component failure within the network device and an overheating of the network device, and the network device is a storage area network switch. Advantageously, improved processing within the computing environment is provided by dynamically optimizing the network device for continued operation, notwithstanding presence of a component failure within the network device or an overheating of the network device, including where the network device is a storage area network switch.

In another aspect, a computer system for facilitating processing within a computing environment is provided.

The computer system includes a memory, and at least one processor in communication with the memory, where the computer system is configured to perform a method, which includes determining, by a network device of the computing environment, that the network device has a defined condition, and obtaining, by the network device, classifications of applications using the network device, where the classifications include multiple different application classifications. Further, the computer system method includes reducing, by the network device, workload through at least one port of the network device based on determining that the network device has the defined condition. The reducing includes reducing workload through the at least one port of the network device of an application of a particular application classification of the multiple different application classifications, without reducing workload through a selected port of the network device of another application of a different application classification of the multiple different application classifications. Improved processing within a computing environment is provided by continuing operation of a network device in an optimized operational configuration, based on presence of a defined condition at the network device, such as a component failure or an overheating condition. In one embodiment, the optimization process facilitates selective network device workload reduction based on determining that the network device has a defined condition. In this manner, operational capacity of the network device is protected for one or more applications, while selectively reducing available capacity for one or more other applications.

In one or more embodiments, the selected port of the network device is a port of the at least one port of the network device, and the reducing includes reducing application workload through the selected port of the network device of the particular application classification, without reducing application workload through the selected port of the network device of the different application classification. In this manner, presence of the defined condition results in application workload through the selected port being selectively reduced based on classification, while allowing workload of a different application classification to pass without reduction.

In one embodiment, the selected port of the network device is different from the at least one port of the network device, and the reducing workload through the at least one port of the network device includes powering OFF the at least one port of the network device without powering OFF the selected port of the network device. In this manner, continued operation of the network device is extended by powering OFF at least one port of the network device without powering OFF another, selected port of the network device, where the powered OFF port is handling workload of an application of the particular application classification.

In one or more embodiments, the identifying includes identifying, by the network device, the location of the at least one port within the network device based on the defined condition. Advantageously, reducing workload through the at least one port of the network device based on location of the at least one port within the network device and based on the defined condition allows for, for instance, reducing workload through the at least one port of the network device in a region of the network device effected by the defined condition, thereby optimizing continued operation of the network device based on presence of the defined condition.

In one or more embodiments, the reducing includes reducing, by the network device, workload through multiple ports of the network device based on determining that the network device has the defined condition, and where the reducing further includes selecting the multiple ports. The selecting includes selecting the multiple ports of the network device from alternate port locations on the network device for potential shutdown. Further, the reducing includes validating for shutdown a port of the multiple ports of the network device by confirming that the port handles only application workload of the particular application classification, and powering OFF the validated port to facilitate reducing workload through the network device. By selecting alternate port locations on the network device for potential shutdown, powering OFF of validated alternate ports facilitates, for instance, dissipation of heat from the network device, particularly in a location of the network device most effected by the defined condition.

In one or more implementations, the determining, by the network device of the computing environment, that the network device has a defined condition includes obtaining operational data on the network device, including one or more components of the network device, and based on the operational data, identifying by the operational device, that the network device has the defined condition, where the defined condition includes a failure of a component of the one or more components of the network device. Advantageously, based on the operational data, the network device identifies presence of the defined condition, where the defined condition includes a failure of a component of the one or more components of the network device, and based on identifying presence of the defined condition, the network device optimizes its continued operation by reducing workload through the at least one port of the network device. The reducing includes selective network device workload reduction to protect operational capacity of the network device for one or more applications, while selectively reducing available capacity for one or more other applications.

In one or more embodiments, the defined condition is an overheating of the network device, and the computer system method further includes identifying a port of the network device within a region of overheating of the network device, where the at least one port of the network device includes the identified port within the region of overheating of the network device. Advantageously, the identified port within the region of overheating of the network device is included in the at least one port of the network device with reduced workload in order to facilitate continued operation of the network device, notwithstanding presence of the defined condition. Further, by reducing workload through the identified port within the region of overheating of the network device, cooling of the network device is facilitated.

In one or more further embodiments, a computer program product for facilitating processing within a computing environment is provided. The computer program product includes one or more computer-readable storage media and program instructions embodied therewith. The program instructions are readable by a processing circuit to cause the processing circuit to perform a method, which includes: determining, by a network device of the computing environment, that the network device has a defined condition; and obtaining, by the network device, classifications of applications using the network device, where the classifications include multiple different application classifications. Further, the method includes reducing, by the network device, workload through at least one port of the network device based on determining that the network device has the defined condition. The reducing includes reducing workload through the at least one port of the network device of an application of a particular application classification of the multiple different application classifications, without reducing workload through a selected port of the network device of another application of a different application classification of the multiple different application classifications. Improved processing within a computing environment is provided by continuing operation of the network device in an optimized operational configuration, based on presence of the defined condition at the network device. In particular, the computer program product implements a method that facilitates selective network device workload reduction based on determining that the network device has a defined condition. In this manner, operational capacity of the network device is protected for one or more applications, while selectively reducing available capacity for one or more other applications.

In one or more embodiments, the identifying includes identifying, by the network device, the location of the at least one port within the network device based on the defined condition. Advantageously, reducing workload through the at least one port of the network device based on location of the at least one port within the network device and based on the defined condition allows for, for instance, reducing workload through the at least one port of the network device in a region of the network device effected by the defined condition, thereby optimizing continued operation of the network device, notwithstanding presence of the defined condition.

In one or more embodiments, the reducing includes reducing, by the network device, workload through multiple ports of the network device based on determining that the network device has the defined condition, where the reducing further includes selecting the multiple ports. The selecting includes selecting the multiple ports of the network device from alternate port locations on the network device for potential shutdown. Further, the reducing includes validating for shutdown a port of the multiple ports of the network device by confirming that the port handles only application workload of the particular application classification, and powering OFF the validated port to facilitate reducing workload through the network device. By selecting alternate port locations on the network device for potential shutdown, powering OFF of validated alternate ports facilitates, for instance, dissipation of heat from the network device, particularly in a location of the network device most effected by the defined condition.

In one or more additional embodiments, computer-implemented methods, computer systems and computer program products for enhancing processing within a computing environment are provided which implement a method including: determining, by a network device of the computing environment, that the network device has a defined condition; obtaining, by the network device, classifications of applications using the network device, where the classifications include multiple different application classifications; and reducing, by the network device, workload through at least one port of the network device based on determining that the network device has the defined condition. The reducing includes reducing workload through the at least one port of the network device of an application of a particular application classification of the multiple different application classifications, without reducing workload through a selected port of the network device of another application of a different application classification of the multiple different application classifications. Further, the selected port of the network device is a port of the at least one port of the network device, and the reducing includes reducing application workload through the selected port of the network device of the particular application classification, without reducing application workload through the selected port of the application device of the different application classification, where the particular application classification is a lower priority application classification, and the different application classification is a higher priority application classification, with the higher priority application classification being a higher priority application classification than the lower priority application classification. Additionally, the reducing includes reducing, by the network device, workflow through multiple ports of the network device based on determining that the network device has the defined condition. The at least one port is at least one port of the multiple ports of the network device, and the reducing includes selecting the multiple ports. The selecting includes selecting the multiple ports of the network device from alternate port locations on the network device for potential shutdown, and validating the shutdown of a port of the multiple ports of the network device by confirming that the port handles only application workload of the particular application classification. Further, the reducing includes powering OFF the validated port to facilitate reducing workload through the network device.

Improved processing within a computing environment is provided by continuing operation of a network device in an optimized operational configuration, based on presence of a defined condition at the network device, such as a computer failure or an overheating condition. In one embodiment, the optimization process facilitates selective network device workload reduction based on determining that the network device has a defined condition. In this manner, operational capacity of the network device is protected for one or more applications, while selectively reducing available capacity for one or more other applications. Presence of the defined condition results in application workload through the selected port being selectively reduced based on classification, while allowing workload of a different application classification to pass without reduction. Advantageously, with presence of the defined condition, the network device prioritizes handling workload of an application with a higher priority application classification over workload of an application with a lower priority application classification, thereby optimizing continued operation of the network device. By selecting alternate port locations on the network device for potential shutdown, powering OFF of validated alternate ports facilitates, for instance, dissipation of heat from the network device, particularly in a location of the network device most effected by the defined condition.

In one or more embodiments, the defined condition is an overheating of the network device, and the method further includes identifying a port of the network device within a region of overheating of the network device, where the at least one port of the network device includes the identified port within the region of overheating of the network device. Advantageously, the identified port within the region of overheating of the network device is included in the at least one port of the network device with reduced workload in order to facilitate continued operation of the network device, notwithstanding presence of the defined condition. Further, by reducing workload through the identified port within the region of overheating of the network device, cooling of the network device is facilitated.

In one or more further embodiments, computer-implemented methods, computer systems and computer program products for enhancing processing within a computing environment are provided which implement a method including: determining, by a network device of the computing environment, that the network device has a defined condition; obtaining, by the network device, classifications of applications using the network device, where the classifications include multiple different application classifications; and reducing, by the network device, workload through at least one port of the network device based on determining that the network device has the defined condition. The reducing includes reducing workload through the at least one port of the network device of an application of a particular application classification of the multiple different application classifications, without reducing workload through a selected port of the network device of another application of a different application classification of the multiple different application classifications. Further, the selected port of the network device is different from the at least one port of the network device, and the reducing workload through the at least one port of the network device further includes powering OFF the at least one port of the network device without powering OFF the selected port of the network device. Additionally, the reducing further includes reducing, by the network device, workload through multiple ports of the network device based on the determining that the network device has the defined condition. The at least one port is at least one port of the multiple ports of the network device, and the reducing includes selecting the multiple ports. The selecting includes selecting the multiple ports of the network device from alternate port locations on the network device for potential shutdown, and validating the shutdown of a port of the multiple ports of the network device by confirming that the port handles only application workload of the particular application classification. Further, the reducing includes powering OFF the validated port to facilitate reducing workload through the network device.

Improved processing within a computing environment is provided by continuing operation of a network device in an optimized operational configuration, based on presence of a defined condition at the network device, such as a computer failure or an overheating condition. In one embodiment, the optimization process facilitates selective network device workload reduction based on determining that the network device has a defined condition. In this manner, operational capacity of the network device is protected for one or more applications, while selectively reducing available capacity for one or more other applications. Continued operation of the network device is extended, in part, by powering OFF at least one port of the network device without powering OFF another, selected port of the network device, where the powered OFF port is handling workload of an application of the particular application classification. By selecting alternate port locations on the network device for potential shutdown, powering OFF of validated alternate ports facilitates, for instance, dissipation of heat from the network device, particularly in a location of the network device most effected by the defined condition.

In one or more embodiments, the defined condition is an overheating of the network device, and the method further includes identifying a port of the network device within a region of overheating of the network device, where the at least one port of the network device includes the identified port within the region of overheating of the network device. Advantageously, the identified port within the region of overheating of the network device is included in the at least one port of the network device with reduced workload in order to facilitate continued operation of the network device, notwithstanding presence of the defined condition. Further, by reducing workload through the identified port within the region of overheating of the network device, cooling of the network device is facilitated.

By way of example, a storage area network (SAN) is a network of storage devices accessible by multiple servers or computers, which provides a shared storage space. Computer memory and local storage resources might not provide enough storage, storage protection, multiple-user access, and/or speed and performance for various applications. Many entities employ some form of a storage area network, as well as a network attached storage (NAS) for improved efficiency and better data management.

By way of further example, cloud storage allows for the saving of data and files in a location that can be addressed through, for instance, the public Internet, and/or a dedicated private network connection. There are many cloud storage solutions in use. Certain storage providers build storage services on private platforms, while other providers use various open-source platforms. For example, cloud storage is available in private, public, and hybrid cloud configurations.

One of the significant factors for any data storage service is the speed of data access, which can be dependent on the data storage devices used, as well as the network devices used to access the data storage devices.

For instance, in the case of a complex data center and hybrid cloud infrastructure environment, multiple components of the environment are typically connected to each other via various network devices. For instance, computational components in a modern hybrid cloud infrastructure and data center can be connected via network devices that are high-speed networking devices, such as Ethernet switches (e.g., 400G Ethernet spine switches). Such network devices not only allow higher bandwidth communications, but they also support additional features which allow for better sharing of the available network bandwidth between systems accessing the network, such as the case with a community network infrastructure. To obtain optimal application performance, reliability of the network paths needs to be a priority. Network devices, such as network switches, network directors, network appliances, etc., with multiple connection ports are key network infrastructure components that need to be monitored and corrected in case any issues arise, since all computational and storage devices of the computing environment are dependent on the network devices for data transmission.

By way of further example only, and as noted, a storage area network (SAN) is a network that presents shared storage devices to multiple servers, where one or more SAN switches are used in one embodiment to connect components together. A SAN switch, which is one specific embodiment of a network device such as discussed herein, manages traffic flow between servers and storage devices, examining data packets and sending the packets to their intended destinations. Ultimately, SAN switches make it possible for thousands of servers to access data through vast, high-speed storage networks. SAN switches typically fall into two classes, Fiber Channel and Ethernet. An Ethernet switch is a multi-port network bridge that uses MAC addresses to forward data to the datalink layer (layer 2) of the Open Systems Interconnect (OSI) model. Certain network devices (e.g., network switches, etc.) can also forward data at the network layer (layer 3) by additionally incorporating routing functionality. Such network devices are commonly known as layer 3 network devices.

A data center system and the hardware components associated with, for instance, a storage area network (SAN) for the data center system, can be vulnerable to overheating. For example, electronic network devices used to facilitate data transfer between servers of the data system and storage devices of the storage area network, typically operate at a specific current induced by a low voltage. Excessive heat can lower the electrical resistance of certain network device components, and therefore can increase the current through those components. Processing and/or communication slowdowns typically result from overheating of one or more network devices (or their components). For instance, network devices and their components can shut down or throttle processing when overheated. As an example, circuit board temperature sensors can be provided to instruct hardware, such as a hard drive and a processor, to slow down when overheated. Additionally, when operating temperature reaches a set threshold limit, then the operating system of the network device can, in certain embodiments, inject a non-maskable interrupt (NMI) to shut down the network device to save the device from thermal breakage and irreversible hardware failure. This is referred to as thermal shutdown of the network device.

In the case of a data center environment, network devices such as discussed herein are normally rated to operate within a certain specified range, for instance, 0° C.-40° C. as an example only. Should temperature increase above that rated range, one or more components of the network device can overheat, and under-rated connectors will not allow for proper contact between the network device and the connector cables, potentially resulting in a network device reboot or thermal shutdown. One reason for an increase in temperature in a network device, can be a network device component failure, such as a fan failure. Since network device fans are moving components, they generally fail earlier than other components of the network device because of the involved mechanics. Where one or more fans of a network device fail, the network device can start to experience overheating due to abnormal heat dissipation within the device, and the overheating can subsequently reach a threshold state for thermal shutdown. In case thermal shutdown is executed, access between the data source(s) and destination(s) (e.g., servers and storage devices) within the computing environment for all device-connected ports can be effected, which can have a significant impact on the provided service, such as in the case of storage-provided services. In the event of thermal shutdown of a network device, then all input output (IO) workload being handled by that network device is stopped for the duration of the shutdown.

Disclosed herein, in one or more aspects, are a network device continuity optimization facility, module and process, which provide dynamic, selective reduction in network device input output (IO) workload, such as data traffic or packet transmissions, through the network device. The selective reduction assists with balancing, for instance, an increased temperature of the network device with continued device operation, allowing the device to temporarily continue to fully operate for, for example, priority input output workload flow and/or for priority network device port operation during the defined condition (such as a network device component failure, or an over-specification temperature).

One or more aspects of the present invention are incorporated in, performed and/or used by a computing environment. As examples, the computing environment can be or include various architectures of various types, including, but not limited to: client-server, distributed, virtual, emulated, partitioned, non-partitioned, cloud-based, quantum, grid, time-sharing, clustered, peer-to-peer, having one node or multiple nodes, having one processor or multiple processors, and/or any other type of environment and/or configuration, etc., that is capable of executing a process (or multiple processes) that, e.g., perform selective network device workload reduction processing, such as disclosed herein. Aspects of the present invention are not limited to a particular architecture or environment. In one or more embodiments, the network device continuity optimization processing disclosed is implemented within the network device itself, depending on the network device. In one embodiment, the network device has multiple transceiver ports to facilitate (for instance) connecting to other devices to, for instance, facilitate data transfer between the other devices. In one or more embodiments, the network device can be one or more of a network switch, a network director, a network appliance, a router, a network hub, a spine and core switch, or other networking infrastructure, such as other cloud backbone network infrastructure, by way of example. Further, in one or more embodiments, the other devices can be one or more servers or computers, one or more storage devices, and/or one or more other networking devices, depending on the computing environment configuration.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as network device continuity optimization module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2:
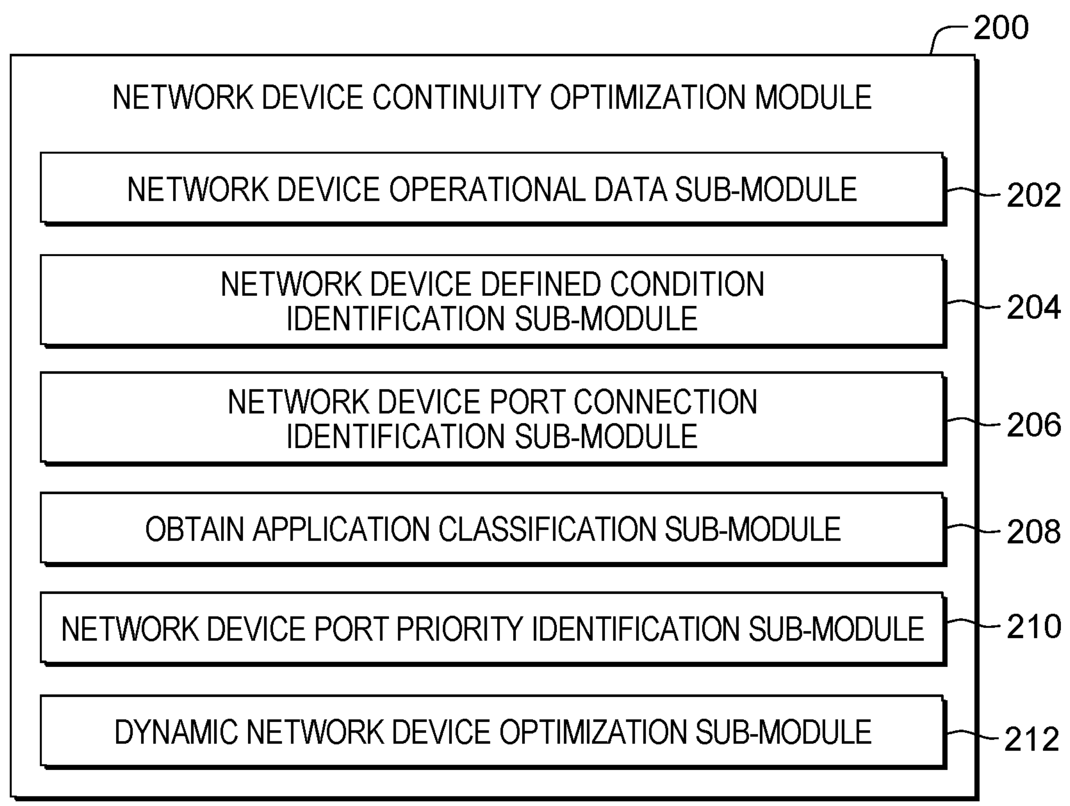
FIG. 2 depicts one embodiment of a computer program product with a network device continuity optimization module, in accordance with one or more aspects of the present invention.
Figure 3:
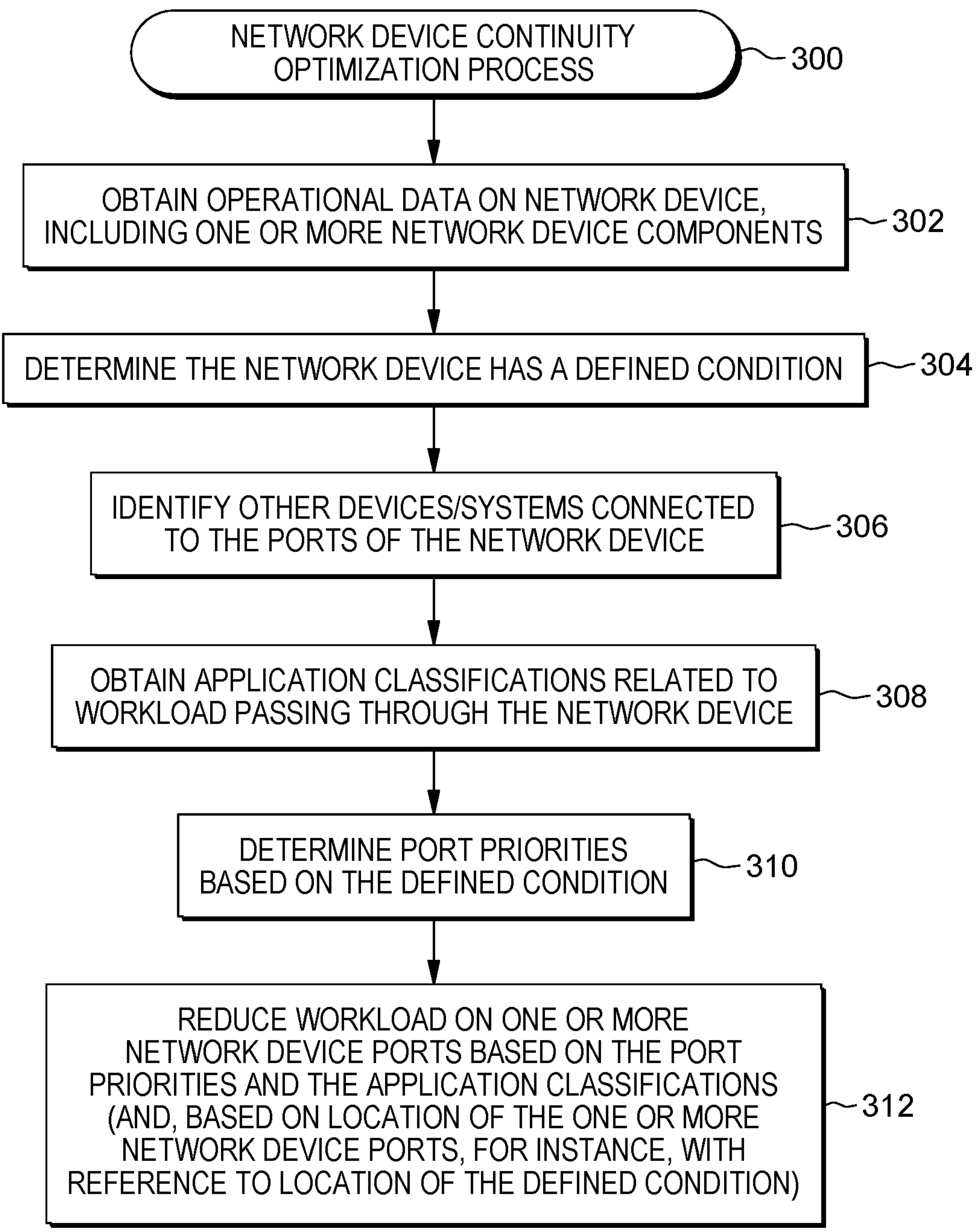
FIG. 3 depicts one embodiment of a network device continuity optimization process, in accordance with one or more aspects of the present invention.

By way of example, one or more embodiments of a network device continuity optimization module and workflow are described initially with reference to FIGS. 2-3. FIG. 2 depicts one embodiment of network device continuity optimization module 200 that includes code or instructions to perform a network device continuity optimization workflow, in accordance with one or more aspects of the present invention, and FIG. 3 depicts one embodiment of a network device continuity optimization workflow, in accordance with one or more aspects of the present invention.

Referring to FIGS. 1 & 2, network device continuity optimization module 200 includes, in one example, various sub-modules used to perform processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of network device continuity optimization module 200 include, for instance, a network device operational data sub-module 202 to obtain operational data on the network device, including one or more network device components, and a network device defined condition identification sub-module 204 to identify by the network device that the network device has a defined condition based on the operational data. The defined condition can include, for instance, a component failure within the network device, an overheating of the network device in one or more regions, or any other specified condition, based upon which it is desirable to selectively reduce input output workload through the network device to ensure continued operability of the network device, for instance, for higher-priority application workload and/or higher priority port connections. In addition, network device continuity optimization module 200 includes, in one or more embodiments, a network device port connection identification sub-module 206 to, for instance, identify and locate connections of other devices (such as storage devices, physical severs, etc.) to one or more ports of the network device with the defined condition. In addition, network device continuity optimization module 200 includes an obtain application classification sub-module 208 to obtain, by the network device, classifications of applications using the network device, where the classifications include multiple different application classifications, and a network device port priority identification sub-module 210 to extract operational priority of the network device ports for use in selective, continued enablement of certain ports, while reducing traffic through, or powering down, one or more other ports based on the defined condition at the network device. In one embodiment, network device continuity optimization module 200 further includes a dynamic network device optimization sub-module 212 to, for instance, reduce by the network device, input output (IO) workload through at least one port of the network device based on determining that the network device has the defined condition. The reducing includes reducing IO workload through the at least one port of the network device of an application of a particular application classification of the multiple different application classifications, without reducing IO workload through a selected port of the network device of another application of a different application classification of the multiple different application classifications. As explained herein, in one or more embodiments, the application can be one or more applications executing on one or more physical servers separate from, but using the network device to, for instance, transfer data to and from one or more other devices, such as one or more storage devices, or other servers or computers, etc. The workload refers to, for instance, the input output (IO) workload or data traffic passing through the network device between the other device(s), such as the server applications and the storage systems or devices. In one or more embodiments, the network device facilitates directing data traffic to the appropriate servers, systems and/or devices.

Advantageously, improved processing within a computing environment is provided by continuing operation of the network device in an optimized workload and port configuration, notwithstanding presence of the defined condition at the network device. For instance, the network device continuity optimization module facilitates selective input output workload reduction through the network device based on determining that the network device has the defined condition. In this manner, operational capacity of the network device is extended, and even protected, for one or more applications, while selectively reducing available capacity for one or more other applications. Note that although various sub-modules are described, selective network device workload reduction module processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform network device continuity optimization processing. FIG. 3 depicts one example of a network device continuity optimization workflow, such as disclosed herein. The method is executed, in one or more examples, by a computer (e.g., computer 101 (FIG. 1)), and/or a processor or processing circuitry (e.g., of processor set 110 of FIG. 1). In one example, code or instructions implementing the method, are part of a module, such as network device continuity optimization module 200. In other examples, the code can be included in one or more other modules and/or in one or more sub-modules of the one or more other modules. Various options are available.

As one example, network device continuity optimization process 300 executing on a computer (e.g., computer 101 of FIG. 1), a processor (e.g., a processor of processor set 110 of FIG. 1), and/or processing circuitry (e.g., processing circuitry of processor set 110), obtains operational data on the network device and network device components 302, and determines whether the network device has a defined condition 304, such as, for instance, has a component failure, an over-temperature condition, etc. Network device continuity optimization process 300 further identifies other devices connected to the ports of the network device 306 and obtains classifications of applications with workload passing through the network device 308 to, for instance, facilitate determining port and/or application priorities based on the defined condition 310. In addition, network device continuity optimization process 300 reduces workload on one or more network device ports based on, for instance, application classifications 312, and in one or more embodiments, based on location of ports within the network device. For instance, where the defined condition is a failed network device component, certain network device ports may be more effected by the failure than other ports.

Figure 4:
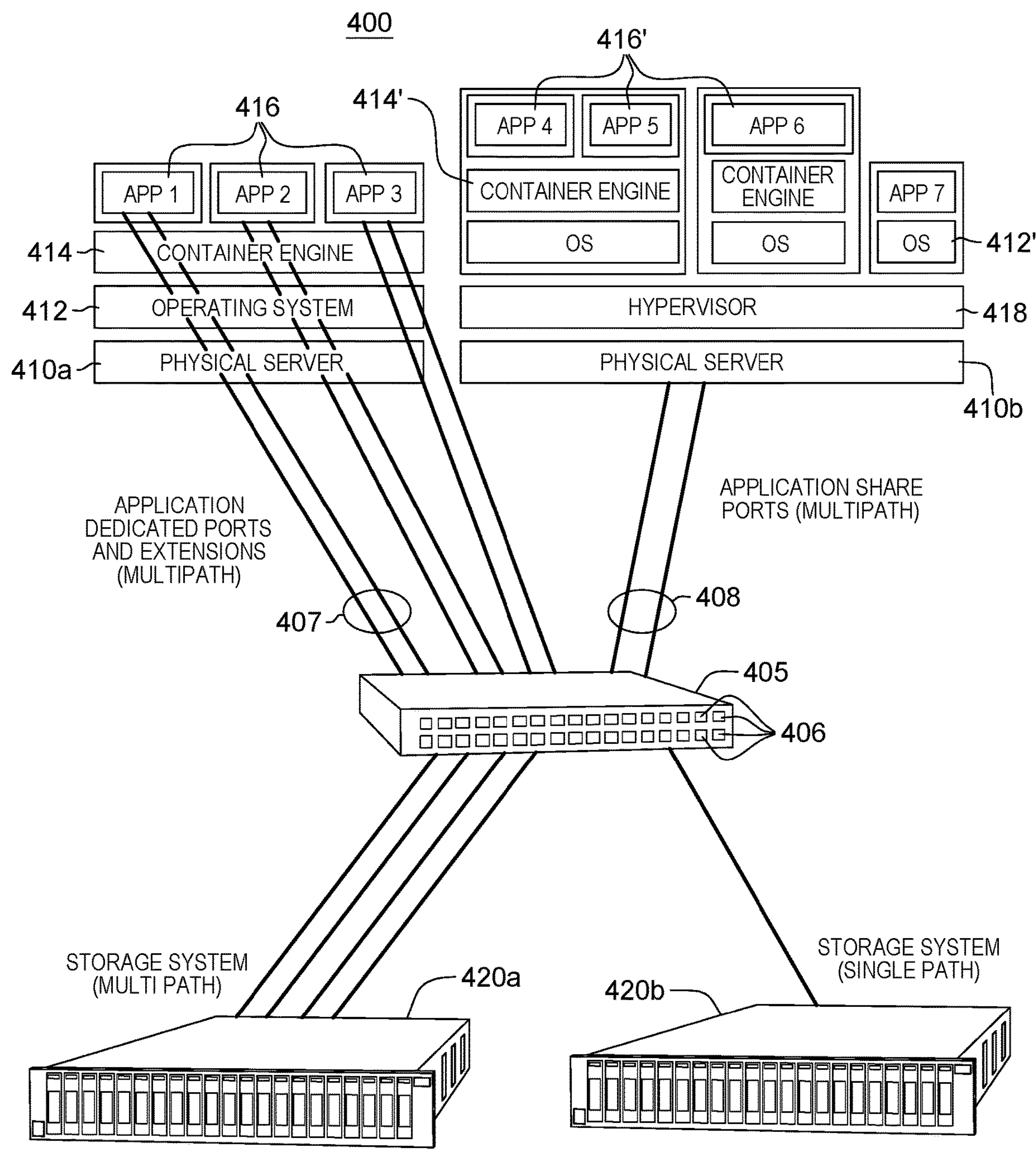
FIG. 4 is a further example of a computing environment to include and/or use one or more aspects of the present invention.

FIG. 4 depicts another embodiment of a computing environment or system 400 into which various aspects of some embodiments of the present invention can be implemented. In one embodiment, system 400 can be, or include, one or more systems 100 described above in connection with FIG. 1. By way of example, system 400 can include multiple physical servers 410*a*, 410*b*, etc., such as physical servers of a data center environment, as well as multiple storage devices or systems 420*a*, 420*b*, and one or more network devices 405 operatively connecting physical servers 410*a*, 410*b* and storage systems 420*a*, 420*b*. In one or more embodiments, storage systems 420*a*, 420*b*, etc., can be part of a storage area network, or a network attached storage environment.

In the embodiment of FIG. 4, each physical server 410*a*, 410*b*, can be, or include, one or more systems, such as one or more systems 100 described above in connection with FIG. 1. In the depicted embodiment, physical servers 410*a*, 410*b* are differently configured, with physical server 410*a* including an operating system 412 and a container engine 414, which support operation of multiple applications 416, and the other physical server 410*b* being configured with a hypervisor 416 supporting, for instance, multiple processes, such as multiple logical partitions, each of which can include a respective operating system 412' instance, and container engine 414' instance for supporting one or more applications 416', running on the different operating system images. In one or more embodiments, applications 416, 416' also have binaries and libraries associated therewith with, for instance, the binaries being in communication with, or accessible to, an interface and sustainability control facility running on the network device, such as described further below.

In FIG. 4, network device 405 is illustrated as including multiple connection ports 406, one or more of which can be, in one embodiment, transceiver ports to facilitate high-speed data transfer between physical servers 410*a*, 410*b* and storage systems 420*a*, 420*b*. In one or more embodiments, network device 405 can be configured to facilitate direct, high-speed data transfer server-to-storage, server-to-server, or storage-to-storage. With server-to-storage data transfer, the same storage device can be accessed serially or concurrently by multiple servers. In a server-to-server configuration, the network device can be used for high speed, low-latency, and high-volume communications between physical servers, and in a storage-to-storage use of the network device, there is an ability to move data without server intervention, which can free up server processing cycles for other activities, such as application processing. Examples can include a disk drive device that backs up its data to tape device without server intervention, or a remote device mirroring across the storage area network.

In the example of FIG. 4, physical server 410*a* has application-dedicated ports and extensions 407, each of which is illustrated in a multipath configuration, while physical server 410*b* has multiple paths established via multiple application-shared, physical server ports 408. Further, in the embodiment of FIG. 4, connections between network device 405 and storage system 420*a* are multipath connections, and between network device 405 and storage system 420*b* there is a single-path connection, by way of example only. In each of these examples, the purpose of network device 405 is to move data traffic between the physical servers and/or the shared storage systems or pools. Network device 405 is used in FIG. 4 to interconnect, for instance, multiple host servers, to one or more storage systems or storage servers. The embodiment of FIG. 4 depicts, however, one example only. In other embodiments, multiple network devices 405 can be used to build larger network and/or larger storage fabrics. The network infrastructure can include hardware and software components that interconnect storage systems and servers, and the network devices can be, or can include, for instance, network hubs, network switches, gateways, network directors, routers, etc. A number of storage area network protocols define the type of connection and determine how the servers, systems, and network devices communicate with each other within a storage area network fabric. In one embodiment, a storage area network can use one protocol or many protocols, and certain devices can be multi-protocol network devices. Generally, network device 405 can be any of a variety of multi-port 406 network devices for a computing environment such as described herein, such as network switches, routers, hubs, spine and core switches, backbone networking infrastructure, network directors, and/or other network appliances. In one or more embodiments, network device 405 facilitates data traffic between other devices of the computing environment, such as between servers 410*a*, 410*b*, and storage systems 420*a*, 420*b*, in the example system of FIG. 4.

Figure 5:
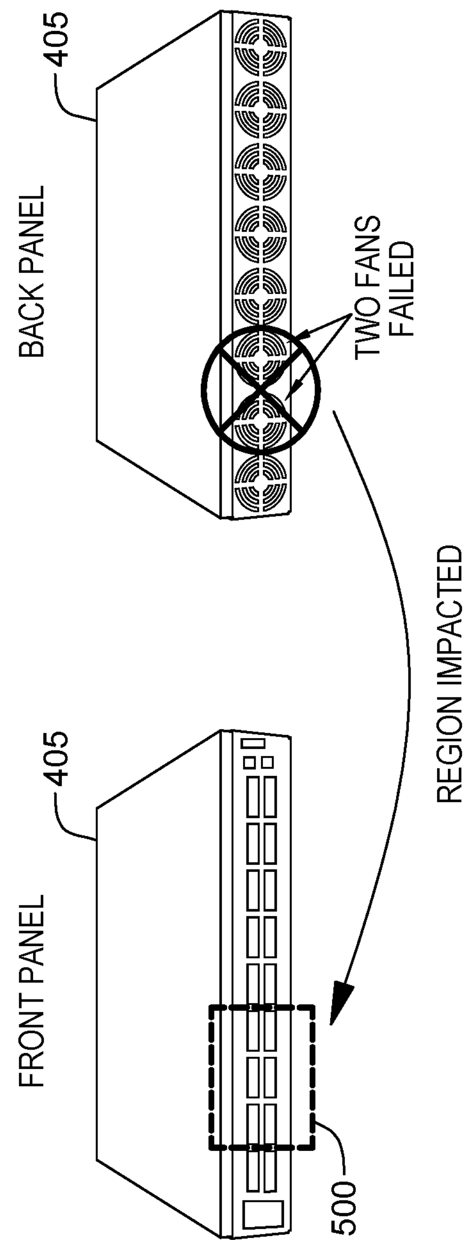
FIG. 5 depicts one embodiment of a network device with two failing network device components, and a workload to be reduced by network device continuity optimization processing, in accordance with one or more aspects of the present invention.

By way of specific example, FIG. 5 depicts a front panel image and back panel image of one embodiment of network device 405, where two failing network components (i.e., two failing fans) are illustrated in the back panel image of network device 405. The failing fans result in abnormal heat dissipation within network device 405, and can subsequently reach an overheating situation, such as within an effected port region 500 of the network device serviced by the failing fans, as shown in the front panel image of FIG. 5. Conventionally, if the overheating situation reaches a specified temperature threshold, then throttling of all workload through the network device is implemented, and if it reaches a critical threshold for thermal shutdown, then the entire network device is powered OFF.

As noted, disclosed herein, in one or more aspects, are a network device continuity optimization facility, module and process, which provide selective reduction in the input output workload passing through the network device based on presence of a defined condition. The selective workload reduction assists with balancing of, for instance, an increase in temperature within the network device against continued network device operation to, for instance, allow the device to continue to operate, so that priority application workload can continue to flow through the network device, and priority network device ports can continue to operate during the defined condition (such as a network device component failure, or an over-specification temperature within the network device).

In one or more embodiments, the network device continuity optimization facility, module and process are implemented as part of an interface and sustainability control component or facility within the network device, such as a control that operates with the network device operating system to detect, for instance, a component failure or an over-specification thermal state of the network device. This can be accomplished by polling network device component status, and accordingly controlling the input output workflow through the network device, and/or the operation of network device ports based on port policy of the network device, to achieve an optimized operation of the network device, notwithstanding existence of the defined condition, which offers a continuity solution when implemented within a computing environment, such as a data center environment.

Figure 6:
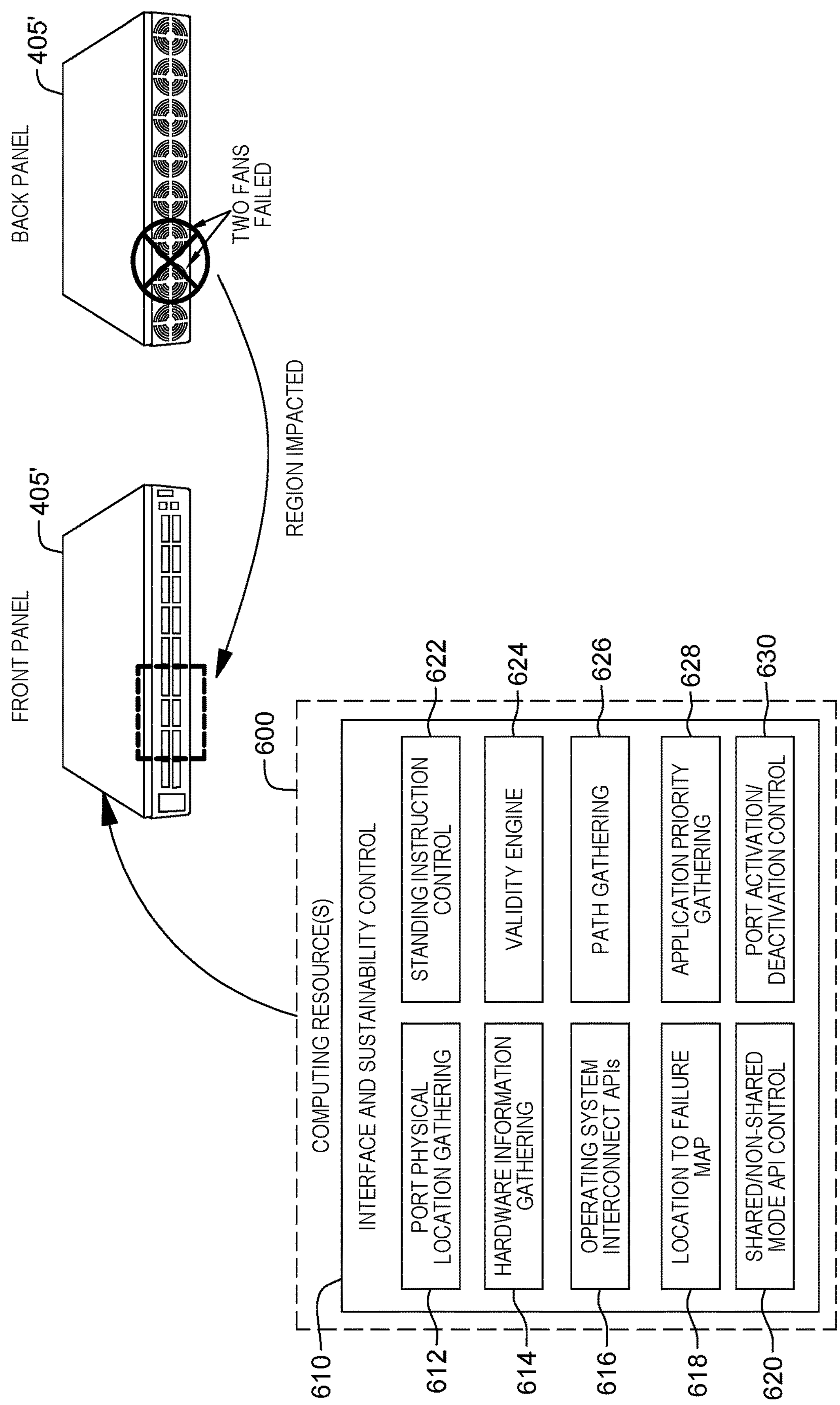
FIG. 6 depicts the network device of FIG. 5, with internal computing resources executing an interface and sustainability control (or controller) with network device continuity optimization processing, in accordance with one or more aspects of the present invention.

FIG. 6 depicts one embodiment of an interface and sustainability control 610 executing on computing resource(s) 600 of a network device 405, such as network device 405 described herein. In one or more embodiments, interface and sustainability control 610 is configured to implement condition-based, selective network device workload reduction, in accordance with one or more aspects of the present invention. By way of example, interface and sustainability control 610 includes, in one or more embodiments, program code to implement multiple different aspects of interface and sustainability control 610. For instance, program code to gather port physical location data 612 is provided, which collects the network device port details and maps the details to the physical location of the ports to understand which network device ports are adjacent ports to each other, sharing one or more common boundaries. Hardware information gathering code 614 facilitates gathering information data about the network device hardware, such as current device temperature, specified operating temperatures, and other network device component statistics. Operating system interconnect application program interfaces (APIs) 616 are provided, and include a set of operating system-level APIs, which are available to obtain and set various commands on the network device. Location to failure map code 618 is configured to obtain the location of the network device ports and map the port locations against location of the defined condition to identify which network device ports are effected by the defined condition or event. For instance, in one or more embodiments, the code maps a network device component failure to particular network device ports most effected by the failure, such as the network device ports with overspecification temperatures. The shared/non-shared mode API control 620 facilitates identifying servers, applications and/or other devices (e.g., storage systems) with shared or non-shared port connections or pathways through the network device. Standing instruction control 622 is a sub-process which, in one embodiment, sends commands to a network device port control, and ensures that the commands are executed properly with, for instance, rc values. A validity engine 624 includes code which implements a process to ensure that shutdown of a selected port is acceptable and/or required, or that baseline conditions have dissolved, and suggests actions accordingly. Path-gathering code 626 is an engine that connects to the other devices from the network device, and gathers associated path information data. For instance, path-gathering 626 gathers data and identifies which other devices (servers, storage systems, etc.) have redundant paths, and which are connected to a single path. Application priority gathering code 628 is an API-based method that communicates with application-level interfaces to know which of the ports (e.g., P0, P1, P2 . . . . Pn) should be used in a port shutdown event.

In one or more embodiments, the interface and sustainability control implementing the condition-based, selective network device workload reduction runs in conjunction with the network device operating system, and collects operational data about network device component status. This component data can be offloaded to the operating system of the network device by an out-of-box driver injection. The operational data for the network device components (such as one or more fans, one or more processors, one or more transceivers, one or more blades, etc.) can be analyzed to determine health of the respective component and operational status of the component, which in one or more embodiments, can be collected into a common platform to locate any data discrepancy, and to evaluate overall health of the network device. In one or more embodiments, the process can detect if any of the network device components have failed. In the case where a component failure is detected, then the out-of-box driver (in one embodiment) can issue a SIGNAL to initiate the computations by the interface and sustainability control for selective network device workload reduction to optimize continued operation of the network device. Once the control receives the signal for optimized toleration of the failed component, then it can further locate other devices connected to the network device ports. For instance, one or more inquiries or requests are sent to peer devices connected to the network device for collecting priority information from or about the other devices. The responses are collected and used to identify priorities of the network device ports, as well as classification priorities of applications transmitting or receiving IO workload through the network device for selective, continued enablement of one or more ports, while powering OFF one or more other ports to, for instance, facilitate addressing an overheating situation. In one or more embodiments, a daemon executes within the network device and facilitates this action of identifying overheating of one or more network device components (and/or ports) to potentially shut down one or more network device ports, or to reduce application IO workload on one or more device ports, depending on the situational context.

In one or more embodiments, the network device continuity optimization facility locates one or more ports which are connected to less-critical workloads, and powers OFF those ports from serving the respective applications. Since the amount of workload (i.e., IO workload) directly effects the amount of heat generated by the device, powering OFF one or more ports will facilitate reducing temperature of the remaining connected ports and connected blades (in the case of a multi-blade network device configuration). To achieve this, data identifying lower priority application IO workload and related port connections is obtained by the network device from, for instance, the connected servers, systems, or other devices. When there are mixed application classifications (e.g., lower priority applications and higher priority applications) connected to the same network device port, then a notification can be issued to the respective server(s) and/or storage device(s) to control or reduce the workload from the lower priority application(s). This can be performed using, for instance, in-band protocol commands, such as SCSI commands using the reserved opcode field to indicate to the server or other device that the network device is not able to process workload from lower-priority applications. In case where priority and non-priority applications are connected to use different network device ports, then the process instructs, in one or more implementations, the network device operating system to power OFF selected ports connected to non-priority applications.

In one or more embodiments, the process further locates physical positions of the network device ports to assist with control of, for instance, a thermal overheating of the network device. Network devices are generally fabricated of a metal body to assist with heat dissipation, and have (in one embodiment) metal transceivers at the ports. When ports are active, electronic components within the ports are active, and hence contributing to heating of the network device. The network device continuity optimization process disclosed herein, in one or more aspects, locates physical location of the ports and preferentially shuts down alternative ports of the network device with reference to their physical location.

For instance, if there are ports<1, 2, 3, 4, 5, 6, 7> in a network device, and all ports are active-ready-running for IO workload handling, they are generating heat. Therefore, shutting down alternate ports from the list, leaving (for instance)<1, 3, 5, 7> running, and shutting down <2, 4, 6, 8> can facilitate dissipating heat within the network device and minimize an overheating condition. With alternate ports being powered OFF, there will not be any heat generated from those ports. Additionally, since the device transceivers and ports are typically fabricated of metal, or include metal, they further contribute towards dissipating heat to the ambient environment by thermal convection and/or thermal conduction. Once off, the powered-OFF ports act as heat sinks for the neighboring, active ports of the network device.

Once network device ports to be powered OFF are selected, then the selected ports can be validated for shutdown based, for instance, on the respective application's multipathing requirements. The process can inquiry or request the multipathing policy from the servers and/or other devices connected to the respective network device ports. To achieve this, information is sent to the application to provide multipathing responses to allow the network device process to determine whether a respective device port can be powered OFF to mitigate the sustainability risk in the network device. For instance, out-of-band application program interfaces (APIs) can be leveraged to obtain this information from the network environment endpoints, with the information then being used in the port selection process, such as described herein.

In the case where the connected server or storage system has no alternate path, and is serving a priority application, then the port is omitted from the shutdown list since it is serving a paramount application or purpose. In such a case, port selection and verification can be made iteratively from a list of potential ports to shut down, to select the best possible options.

In one or more implementations, the process further considers the roles of the ports to be shut down. For instance, if there is an inter-switch link (ISL link), then the port should not be removed from operation, as every connection would be effected. In weightage-based assignments, such as described herein, the ISL port would have a top contribution value, followed by the IO workload of higher priority applications, and then followed by the IO workload of lower priority applications (in one embodiment).

Advantageously, the network device continuity optimization facility, module and process disclosed herein facilitate retaining network device performance for certain incoming IO workloads, notwithstanding detection of a defined condition at the network device (such as a device overheating situation, as might occur when one or more network device components fail), thereby making the entire computing environment more resilient to being impacted by the network device defined condition. Further, the selective network device workload reduction disclosed avoids a data loss situation due to network device component failure. In one or more embodiments, the network device continuity optimization facility temporarily overrides specified port activation access and management policies to serve the IO workloads of certain applications, and to bypass interaction with lower priority (e.g., non-critical) workloads to facilitate continued operation of the network device (until the defined condition can be addressed, such as by replacement of a failed device component). Further, the network device continuity optimization facility can advantageously be used for dynamic selection of actions depending on, for instance, the significance of the defined condition event. The network device continuity optimization facility can be implemented along with a variety of available storage systems and networking devices. Advantageously, the selective network device workload reduction can address an overheating of a network device, and provide a sustainability solution using software-based implementation of policy adjustments, along with, for instance, the pausing of additional workloads, that strengthens (in one embodiment) the software-defined storage implementation. The network device continuity optimization facility disclosed can be extended to a variety of network devices, as well as to, for instance, host caches, edged-cloud implementations, etc.

FIGS. 7-11 depict further details of one or more embodiments of a network device continuity optimization process, in accordance with one or more aspects of the present invention. As one example, the process can initiate in conjunction with a network device's operating system with, for instance, a metadata repository being loaded, and data structures initialized to collect the various data or data streams described herein. In one or more embodiments, a processing thread for data collection and network device component status monitoring can be initiated. For instance, the data collection stream can be saved into the metadata mapper classes at the network device. Optionally, a data lookup can be offloaded to the network device operating system, which can be used via an out-of-box driver injection process.

In one embodiment, operational data can be collected for network device components (e.g., network device fans, processors, transceivers, blades, etc.). The collected data can be saved to a common data structure or platform to, for instance, facilitate locating any discrepancy for overall network device operational health, and/or operational component health. The collected data can include, for instance, information data such as specified in Tables 1 & 2 below, in one example only.

TABLE 1

| Temperature Value | Workload Throttling Weightage |
|---|---|
| TI | >20 |
| T2 | >40 |
| T3 | >56 |
| . . . | . . . |

TABLE 2

| Port_ID | Server_ID | Link Standards |
|---|---|---|
| 1 | 0x01 A1 | Gold |
| 2 | 0x01 BC | Gold |
| 3 | 0x01 F2 | Bronze |
| . . . | . . . | . . . |

Figure 7:
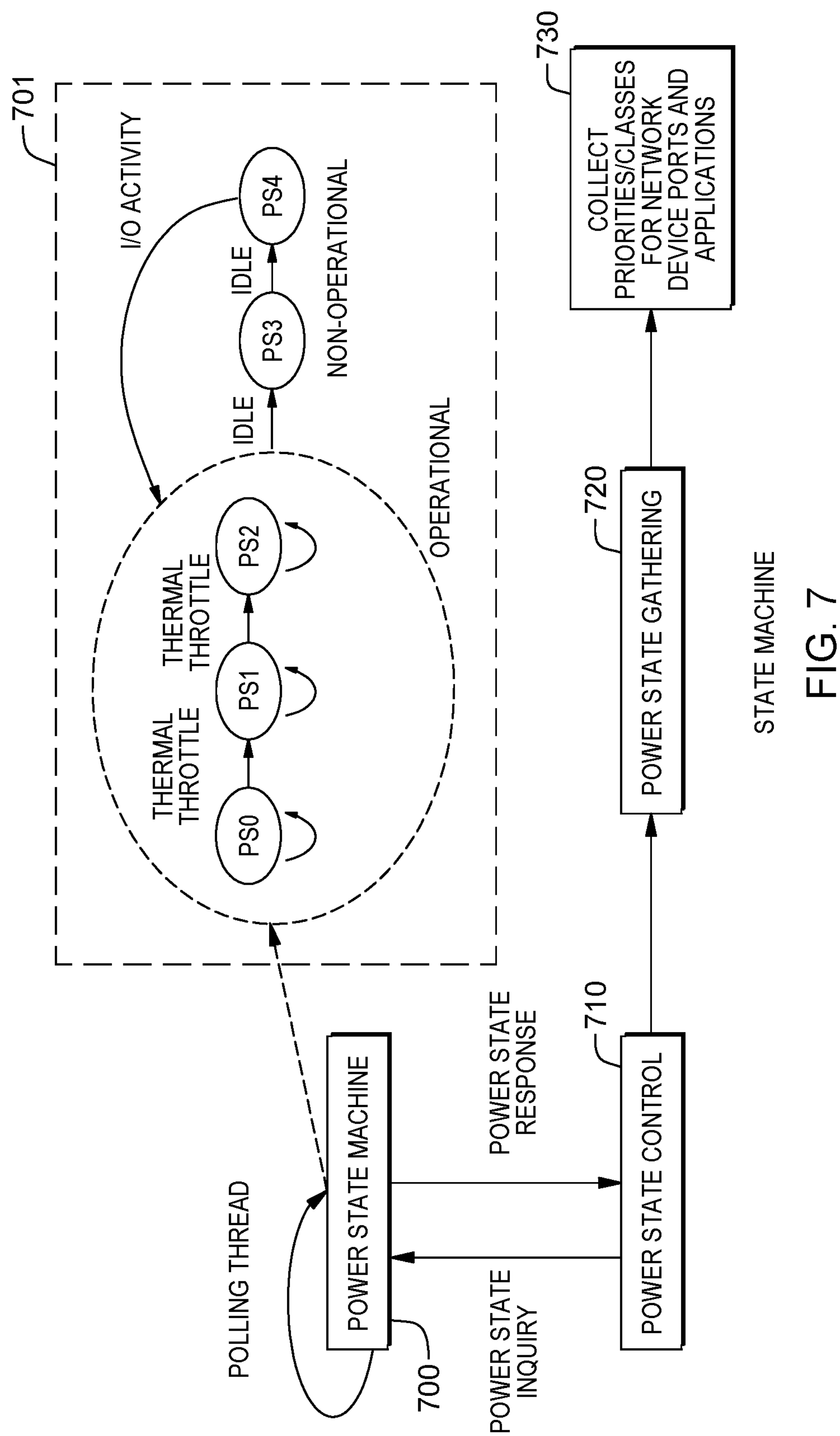
FIG. 7 depicts one embodiment of a power state machine of the interface and sustainability control of FIG. 6, with network device continuity optimization processing, in accordance with one or more aspects of the present invention.

Based on the obtained data, the network device continuity optimization process determines whether the network device has a defined condition. In one embodiment, this can include determining whether a network device component has failed.

Where the defined condition is detected within the network device, for instance, a network device component has failed, then in one embodiment, an out-of-box driver can inject a SIGNAL to initiate determination of an optimized operational configuration for the network device. FIG. 7 illustrates an example of this as a state machine.

In the embodiment of FIG. 7, a power state machine 700 is depicted, along with a conventional approach 701 to addressing a network device component failure. In the conventional approach, the power state machine transitions between different power states PS0 . . . PS4, where the state machine, for instance, throttles all workload through the network device based on thermal state of the network device, with the workload increasingly being throttled from PS0, to PS1, to PS2. Once exceeding a certain thermal threshold, the power state machine enters device non-operational power states PS3, PS4, where there is no input output activity across the network device. In contrast to this conventional approach, a power state control 710 is provided, such as in interface and sustainability control 610 of FIG. 6, wherein the power state is periodically obtained, and associated power state data is gathered 720, as well as priorities/classes for network device ports and applications sending or receiving IO data through the network device 730. With this information, the process selectively reduces workload through at least one port of the network device of an application of a particular application classification, without reducing workload through one or more other selected ports of the network device for one or more other applications with different application classifications (e.g., non-priority (lower priority) versus priority (higher priority) application classifications).

In the case where the process is initiated to determine optimized toleration for, for instance, network device component failure, then in one or more embodiments, the process further collects identification data for the server, system or device connected to each of the network device ports, and an inquiry command is sent to the peer devices for collecting application classification or priority information from the other devices (e.g., servers, storage systems, etc.). The responses to the inquiries can be saved or collected at the interface and sustainability control, in one embodiment.

In one or more implementations, the response data is parsed to extract, for instance, priorities of the network device ports, and workload priorities for applications using the network device ports, to enable selective, continued operation of the network device notwithstanding presence of the defined condition. In one embodiment, a daemon is used to perform respective actions on the network device ports, such as those effected by the defined condition (e.g., an overheating condition). In one embodiment, the daemon is a process executing inside the network device looking for the defined condition (e.g., one or more prespecified events). An action based on determining that there is an overheating of a network device port can be to shut down one or more ports, whether it is the same port that is experiencing the overheating, or an adjacent or neighboring port, based on the selective network device workload reduction process and the situational context.

In one or more embodiments, the network device continuity optimization facility locates device ports that are connected to lower priority IO workload (i.e., IO workload of a lower application classification) and reduces the amount of that lower priority IO workload, for instance, temporarily, progressively reduces or even stops the lower priority workload based on one or more over-temperature setpoints. In one embodiment, the applications with lower priority application classification and their connected ports are identified by the interface and sustainability control. Where both lower priority applications and higher priority applications are connected to the same network device port, then in one embodiment, an in-band notification using, for instance, SCSI commands, is sent to the other device (e.g., server, storage system, etc., connected to the port) using the reserved opcode field (in one example). The other device accepts the command and enforces reduction in the IO workload on the respective network device port by the lower priority application. Where lower priority applications and the higher priority applications are connected to different physical network device ports, then the selective network device workload reduction facility instructs the network device operating system to power down the selected network device port(s) serving the lower priority applications.

In one embodiment, the network device continuity optimization facility locates the physical position of each network device port (e.g., in available network device blades) based on detecting the defined condition, for instance, to facilitate control of an overheating condition within the network device. The physical position of ports can be located, and alternate locations can be selected for further evaluation and validation for possible powering OFF, such as described herein. Once the network device ports to be powered OFF are selected (that is, the alternate ports are selected), then the selected ports can be further evaluated for validation, for instance, of the effected application's multipathing requirements. In one embodiment, the multipathing policy of each respective application at issue is located by the interface and sustainability control, and where necessary, a request can be sent to the effected application for multipathing data responses for the control to understand whether alternate device pathing is available should the selected port be validated or shut down. In one embodiment, out-of-band API interfaces can be leveraged to obtain this information from the other devices, with the information then being superimposed on, or considered in making the port shutoff selection decision by the control. An example of this is depicted in FIG. 8.

Figure 8:
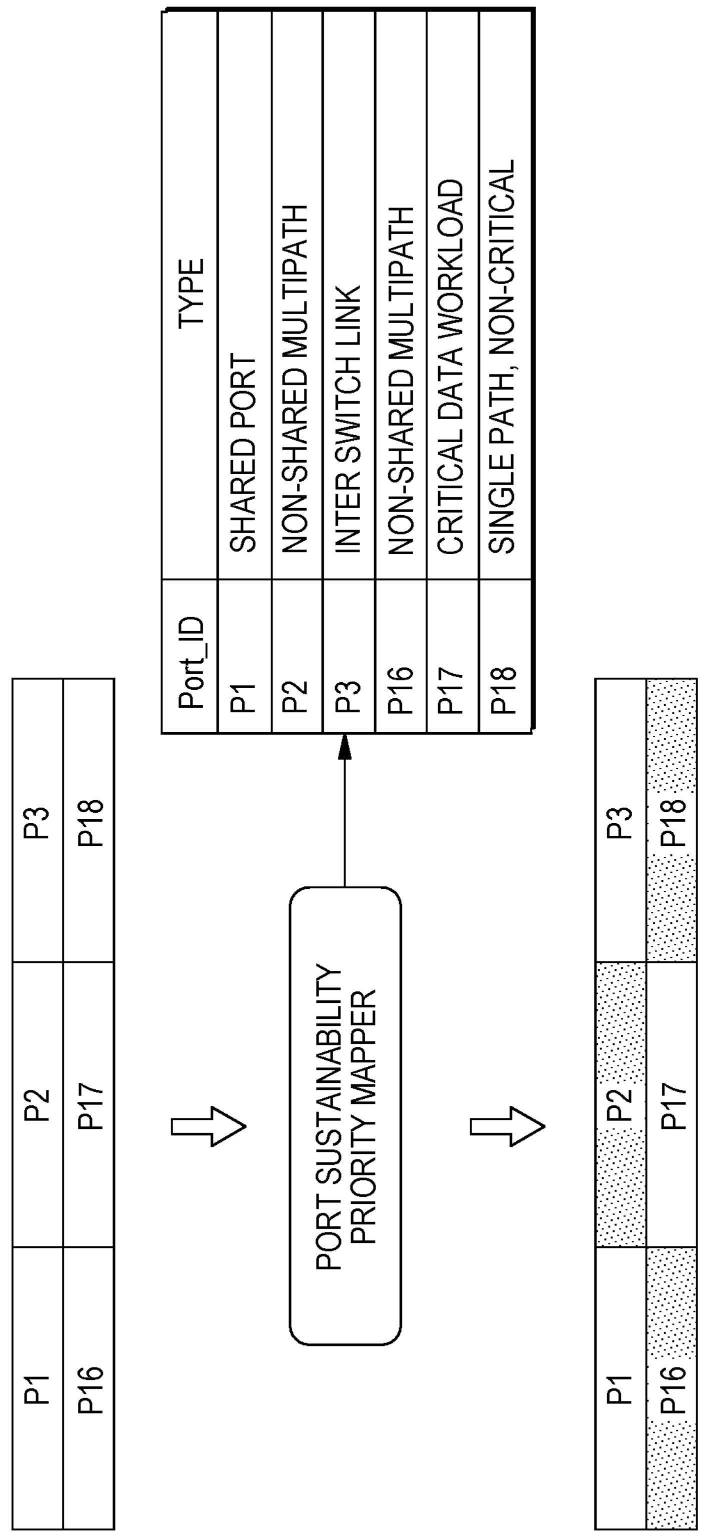
FIG. 8 is an example of application classification-based, port classification-based, and port location-based continuity optimization processing, in accordance with one or more aspects of the present invention.

In FIG. 8, six ports of a network device are illustrated, including ports P1, P2, P3, P16, P17 & P18, arranged in the device as shown. The port sustainability priority mapper process disclosed is performed, with alternate ports P2, P16 & P18 being identified for shutdown. Note that in one embodiment, the illustrated ports can cover an entire port region effected by a defined condition within the network device, or can be a portion of the port region effected. Note that in one or more embodiments, the shutdown ports, that is, ports P2, P16 & P18, are powered OFF to (in part) dissipate heat from the neighboring ports, which remain active, that is, ports P1, P3 & P17, in the example. Note also that the particular ports for shutdown are selected, in part, based on the application workload priorities, as well as the port priorities. In the example illustrated, port P3 is an inter-switch link (e.g., coupling two network devices), and therefore is given highest priority to remain operational in the optimization process. Further, port P17 is indicated to have critical data workload (i.e., higher workload priority), and is also to remain operational in the optimized configuration. Based on this information, port P2 can be powered OFF since it is a non-shared, multipath-connected port (i.e., the application(s) using the port has multiple path options through the network device), port P16 is also a non-shared, multipath-connected port, and port P18 is a single path, non-critical data workload (i.e., lower workload priority) connected port.

Figure 9:
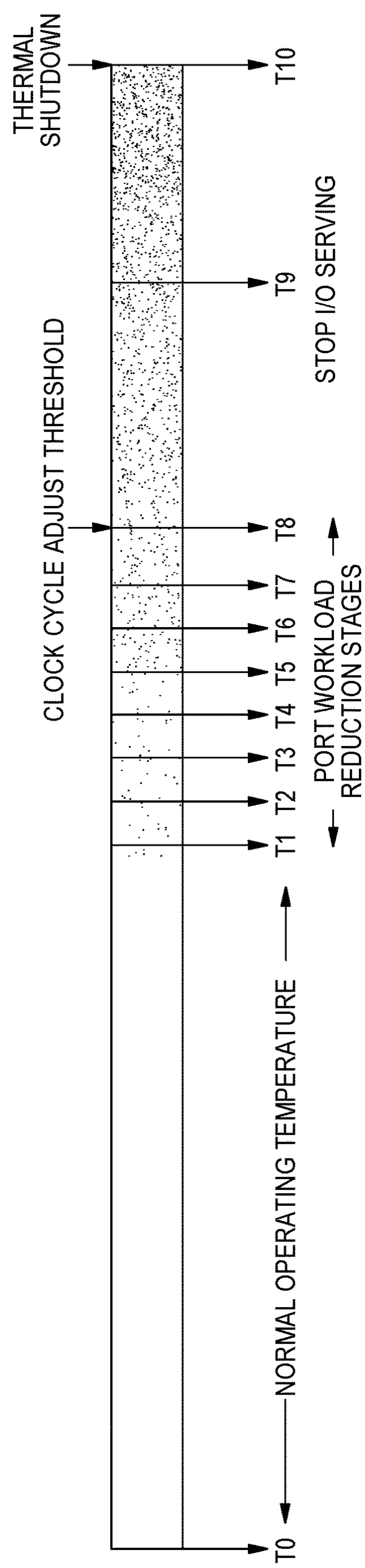
FIG. 9 depicts one embodiment of a thermal state diagram for selective network device workload reduction processing, in accordance with one or more aspects of the present invention.

In one embodiment, the network device continuity optimization process instructs that the selected workload paths be made offline, and the validated network ports be powered OFF, at least temporarily to allow the defined condition to dissipate and/or be addressed, such as by replacement of the failed component. A polling thread can be activated to check network device temperature and/or network device component temperature. In one or more embodiments, the validity of the defined condition will be determined on the basis of specified thresholds and the current status comparisons. An example of this is depicted in FIG. 9 where, for instance, temperatures T0 to T1 are specified normal operating temperatures for the network device(s) or network device component(s), temperatures T1 to T8 initiate respective granularity of port network reduction stages, such as disclosed herein. For instance, the amount of IO workload selectively reduced through the network device can be increased granularly with increasing network device temperature up to, for instance, a clock cycle adjustment threshold, T8 in the example depicted. Between temperatures T8 and T9, a full network device clock cycle throttling can occur for the remaining optimized workload, and from temperature T9 to T10, the network device can stop serving incoming input output workload, and at temperature T10, thermal shutdown of the network device can occur.

Figure 10:
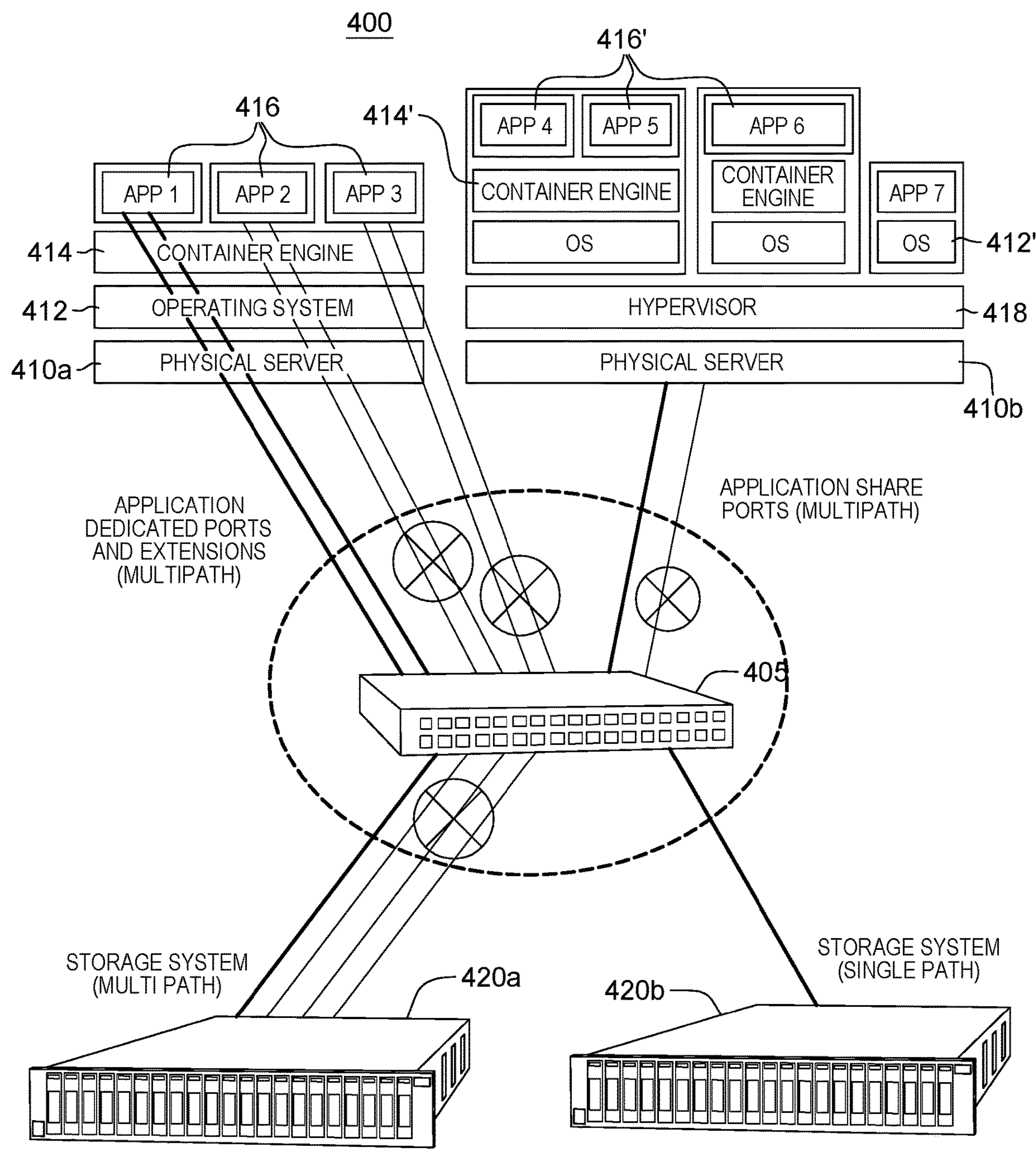
FIG. 10 depicts the computing environment embodiment of FIG. 4, with selected ports of the network device powered OFF to facilitate an optimized operation of the network device, with continued flow of workload through other ports of the network device, in accordance with one or more aspects of the present invention.

By way of example, FIG. 10 depicts the computing environment embodiment of FIG. 4, with selected application pathways deactivated and selected ports of the network device powered OFF to facilitate an optimized operation configuration of the network device, with continued flow of workload through other ports of the network device, notwithstanding existence of the defined condition within the network device.

Figure 11:
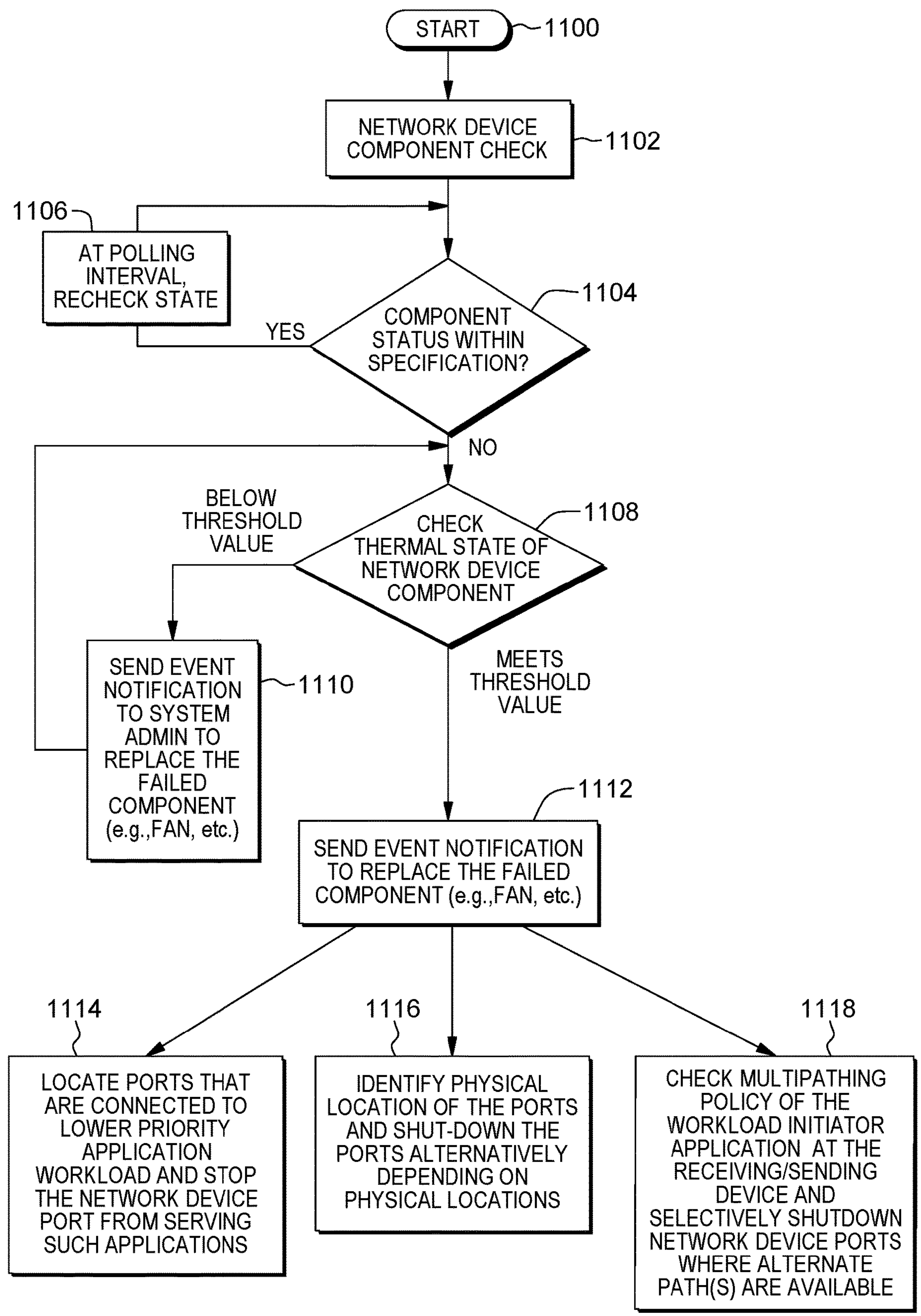
FIG. 11 depicts a further embodiment of a network device continuity optimization workflow, in accordance with one or more aspects of the present invention.

FIG. 11 depicts a further embodiment of a network device continuity optimization process, in accordance with one or more aspects of the present invention. Referring to FIG. 11, the process starts 1100 with network device component checking 1102 by, for instance, obtaining and evaluating operational data on the network device itself and/or one or more network device components. The process determines whether operational status of the network device components are within specification 1104 by, for instance, checking each monitored network device component iteratively. If "yes", then at a set polling interval, operational states of the monitored network device components are rechecked 1106. Once the network device has an identified defined condition (e.g., one or more network device components are out of specification, such as by a temperature exceeding a specified temperature range), the thermal state of the network device is checked 1108. As long as the thermal state is below a threshold value, no optimized workload processing is needed, and an event notification can be sent, for instance, to a system administrator to replace the failing network device component (e.g., a failing fan, failing circuit board, etc.) 1110.

Where the thermal state of the network device component does meet a set threshold value (which can be any of multiple threshold values, such as discussed above in connection with FIG. 9), an event notification is again sent, for instance, to a system administrator, to replace the failed or failing network device component 1112. In one embodiment, the selective network device workload reduction process performs processing as discussed herein, including, for instance, locating network device ports that are connected to handle lower priority application IO workload, and stops those network device ports from servicing the lower priority application IO workload 1114. In addition, the physical locations of the network device ports are identified, and ports in alternative locations are shut down, depending on the physical locations, and depending on the validity analysis, such as described herein. For instance, multiple ports can be selected for evaluation, where the multiple ports are alternate port locations on the network device for potential shutdown. Further, in one or more embodiments, the process checks for the multipathing policy of the IO workload initiator application at the receiving/sending device, and selectively shuts down network device ports where alternate paths are available 1118, such as described herein.

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described herein using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

The terminology used herein is for the purpose of describing particular embodiments only and is not intended to be limiting of the invention. As used herein, the singular forms "a", "and" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for enhancing processing within a computing environment, the computer-implemented method comprising:

determining, by a network device of the computing environment, that the network device has a defined condition;

based on determining that the network device has the defined condition, determining, by the network device for a plurality of ports of the network device, respective port priorities based on other devices connected to the plurality of ports and based, at least in part, on the defined condition;

obtaining, by the network device, classifications of applications using the network device, the classifications including multiple different application classifications; and reducing, by the network device, combined workload through at least one port of the plurality of ports of the network device based on determining that the network device has the defined condition and based on the determined port priorities based on the defined condition and the determined classifications of applications using the network device, the reducing combined workflow through the at least one port including reducing workload through the at least one port of the network device of an application of a particular application classification of the multiple different application classifications, without reducing workload through a selected port of the plurality of ports of the network device of another application of a different application classification of the multiple different application classifications.

2. The computer-implemented method of claim 1, wherein the selected port of the network device comprises a port of the at least one port of the network device, and wherein the reducing combined workflow through the at least one port comprises reducing application workload through the selected port of the network device of the particular application classification, without reducing application workload through the selected port of the network device of the different application classification.

3. The computer-implemented method of claim 2, wherein the particular application classification is a lower priority application classification, and the different application classification is a higher priority application classification, the higher priority application classification being a higher priority application classification than the lower priority application classification.

4. The computer-implemented method of claim 1, wherein the selected port of the network device is different from the at least one port of the network device, and wherein the reducing workload through the at least one port of the network device further comprises powering OFF the at least one port of the network device without powering OFF the selected port of the network device.

5. The computer-implemented method of claim 1, further comprising identifying, by the network device, the at least one port based on a location of the at least one port within the network device.

6. The computer-implemented method of claim 5, wherein the identifying comprises identifying, by the network device, the location of the at least one port within the network device further based on the defined condition.

7. The computer-implemented method of claim 1, wherein the reducing further comprises reducing, by the network device, workload through multiple ports of the plurality of ports of the network device based on determining that the network device has the defined condition, the at least one port being at least one port of the multiple ports of the network device, and wherein the reducing further comprises:

selecting the multiple ports, the selecting including selecting the multiple ports of the network device from alternate physical port locations on the network device for potential shutdown;

validating for shutdown a port of the multiple ports of the network device by confirming that the port handles only application workload of the particular application classification; and powering OFF the validated port to facilitate reducing workload through the network device.

8. The computer-implemented method of claim 1, wherein the determining, by the network device of the computing environment, that the network has the defined condition comprises:

obtaining operational data on the network device, including one or more components of the network device; and based on the operational data, identifying by the network device, that the network device has the defined condition, where the defined condition comprises a failure of a component of the one or more components of the network device.

9. The computer-implemented method of claim 1, wherein the defined condition is an overheating of the network device, and the computer-implemented method further comprises identifying a port of the network device within a region of overheating of the network device, wherein the at least one port of the network device includes the identified port within the region of overheating of the network device.

10. The computer-implemented method of claim 1, wherein the defined condition is selected from the group consisting of a sub-component failure of the network device, and an overheating of the network device, and wherein the network device comprises a storage area network switch.

11. A computer system for facilitating processing within a computing environment, the computer system comprising:

a memory; and at least one processor in communication with the memory, wherein the computer system is configured to perform a method, said method comprising:

determining, by a network device of the computing environment, that the network device has a defined condition;

based on determining that the network device has the defined condition, determining, by the network device for a plurality of ports of the network device, port respective priorities based on other devices connected to the plurality of ports and based, at least in part, on the defined condition;

obtaining, by the network device, classifications of applications using the network device, the classifications including multiple different application classifications; and reducing, by the network device, combined workload through at least one port of the plurality of ports of the network device based on determining that the network device has the defined condition and based on the determined port priorities based on the defined condition and the determined classifications of applications using the network device, the reducing combined workflow through the at least one port including reducing workload through the at least one port of the network device of an application of a particular application classification of the multiple different application classifications, without reducing workload through a selected port of the plurality of ports of the network device of another application of a different application classification of the multiple different application classifications.

12. The computer system of claim 11, wherein the selected port of the network device comprises a port of the at least one port of the network device, and wherein the reducing combined workflow through the at least one port comprises reducing application workload through the selected port of the network device of the particular application classification, without reducing application workload through the selected port of the network device of the different application classification.

13. The computer system of claim 11, wherein the selected port of the network device is different from the at least one port of the network device, and wherein the reducing workload through the at least one port of the network device further comprises powering OFF the at least one port of the network device without powering OFF the selected port of the network device.

14. The computer system of claim 11, wherein the identifying comprises identifying, by the network device, the location of the at least one port within the network device based on the defined condition.

15. The computer system of claim 11, wherein the reducing further comprises reducing, by the network device, workload through multiple ports of the plurality of ports of the network device based on determining that the network device has the defined condition, the at least one port being at least one port of the multiple ports of the network device, and wherein the reducing further comprises:

selecting the multiple ports, the selecting including selecting the multiple ports of the network device from alternate physical port locations on the network device for potential shutdown;

validating for shutdown a port of the multiple ports of the network device by confirming that the port handles only application workload of the particular application classification; and powering OFF the validated port to facilitate reducing workload through the network device.

16. The computer system of claim 11, wherein the determining, by the network device of the computing environment, that the network has the defined condition comprises:

obtaining operational data on the network device, including one or more components of the network device; and based on the operational data, identifying by the network device, that the network device has the defined condition, where the defined condition comprises a failure of a component of the one or more components of the network device.

17. The computer system of claim 11, wherein the defined condition is an overheating of the network device, and the computer-implemented method further comprises identifying a port of the network device within a region of overheating of the network device, wherein the at least one port of the network device includes the identified port within the region of overheating of the network device.

18. A computer program product for facilitating processing within a computing environment, the computer program product comprising:

one or more computer readable storage media and program instructions embodied therewith, the program instructions being readable by a processing circuit to cause the processing circuit to perform a method comprising:

determining, by a network device of the computing environment, that the network device has a defined condition;

based on determining that the network device has the defined condition, determining, by the network device for a plurality of ports of the network device, respective port priorities based on other devices connected to the plurality of ports and based, at least in part, on the defined condition;

obtaining, by the network device, classifications of applications using the network device, the classifications including multiple different application classifications; and reducing, by the network device, combined workload through at least one port of the plurality of ports of the network device based on determining that the network device has the defined condition and based on the determined port priorities based on the defined condition and the determined classifications of applications using the network device, the reducing combined workflow through the at least one port including reducing workload through the at least one port of the network device of an application of a particular application classification of the multiple different application classifications, without reducing workload through a selected port of the plurality of ports of the network device of another application of a different application classification of the multiple different application classifications.

19. The computer program product of claim 18, wherein the identifying comprises identifying, by the network device, the location of the at least one port within the network device based on the defined condition.

20. The computer program product of claim 18, wherein the reducing further comprises reducing, by the network device, workload through multiple ports of the plurality of ports of the network device based on determining that the network device has the defined condition, the at least one port being at least one port of the multiple ports of the network device, and wherein the reducing further comprises:

selecting the multiple ports, the selecting including selecting the multiple ports of the network device from alternate physical port locations on the network device for potential shutdown;

validating for shutdown a port of the multiple ports of the network device by confirming that the port handles only application workload of the particular application classification; and powering OFF the validated port to facilitate reducing workload through the network device.

* * * * *